United States Patent
Georgis et al.

(10) Patent No.: US 8,311,734 B2
(45) Date of Patent: Nov. 13, 2012

(54) AUTOMATIC SPEED LIMIT ADJUST FOR ROAD CONDITIONS

(75) Inventors: Nikolaos Georgis, San Diego, CA (US);
Fredrik Carpio, San Diego, CA (US);
Paul Jin Hwang, Burbank, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 980 days.

(21) Appl. No.: 12/165,730

(22) Filed: Jul. 1, 2008

(65) Prior Publication Data
US 2010/0004838 A1 Jan. 7, 2010

(51) Int. Cl.
*G01C 21/00* (2006.01)

(52) U.S. Cl. ......... 701/423; 701/415; 701/439; 701/70; 701/93; 701/97

(58) Field of Classification Search ............. 701/70, 701/93, 97, 415, 423, 439
See application file for complete search history.

(56) References Cited

U.S. PATENT DOCUMENTS

| | | | | |
|---|---|---|---|---|
| 5,748,476 A * | 5/1998 | Sekine et al. | | 701/93 |
| 5,806,018 A * | 9/1998 | Smith et al. | | 701/538 |
| 6,052,644 A * | 4/2000 | Murakami et al. | | 701/93 |
| 6,356,833 B2 * | 3/2002 | Jeon | | 701/93 |
| 6,622,087 B2 * | 9/2003 | Anderson | | 701/423 |
| 6,810,321 B1 * | 10/2004 | Cook | | 701/117 |
| 6,895,324 B2 * | 5/2005 | Straub | | 701/93 |
| 6,973,384 B2 * | 12/2005 | Zhao et al. | | 701/117 |
| 7,426,437 B2 * | 9/2008 | Breed et al. | | 701/301 |
| 7,734,404 B2 * | 6/2010 | Shiiba et al. | | 701/70 |
| 2003/0130779 A1 * | 7/2003 | Shiimado et al. | | 701/65 |
| 2006/0055565 A1 | 3/2006 | Kawamata et al. | | |
| 2006/0224294 A1 * | 10/2006 | Kawazoe et al. | | 701/93 |
| 2007/0076758 A1 | 4/2007 | Kim et al. | | |
| 2007/0115113 A1 * | 5/2007 | Wang | | 340/539.13 |
| 2007/0168110 A1 * | 7/2007 | Jiang et al. | | 701/117 |
| 2007/0213896 A1 | 9/2007 | Fischer | | |
| 2008/0059036 A1 * | 3/2008 | Imai et al. | | 701/93 |
| 2008/0140318 A1 | 6/2008 | Breed | | |
| 2008/0154629 A1 * | 6/2008 | Breed et al. | | 705/1 |
| 2009/0005945 A1 * | 1/2009 | Takeda et al. | | 701/70 |

FOREIGN PATENT DOCUMENTS

| | | |
|---|---|---|
| CN | 2800406 Y | 7/2006 |
| DE | 195 43 551 | 5/1996 |

OTHER PUBLICATIONS

Jan, "GPS Navigation reviews; Navigon Mobile Navigator 6 & ALK CoPilot Live for Symbian S60", http://n95blog.com/gps-navigation-reviews-navigon-mobile-navigator-6-alk-copilot-live-for-symbian-s60/, Jun. 15, 2007.

* cited by examiner

*Primary Examiner* — Lesley D Morris
*Assistant Examiner* — Michael Stabley
(74) *Attorney, Agent, or Firm* — John L. Rogitz

(57) ABSTRACT

A mobile computer that can be borne in a vehicle and that can receive position information may adjust a maximum speed limit to account for unfavorable weather or road conditions and cause the vehicle to automatically reduce speed below the adjusted maximum limit.

12 Claims, 2 Drawing Sheets

AUTOMATIC SPEED LIMIT ADJUST FOR ROAD CONDITIONS

FIELD OF THE INVENTION

The present invention relates generally to automatically adjusting a maximum speed limit value for road conditions and to automatically reducing a vehicle's speed to below the adjusted limit.

BACKGROUND OF THE INVENTION

Electronic roadside signs have been provided to post speed limits. Because the signs can be controlled by a remote facility, the posted speed limits may be easily changed. However, as understood herein these signs are relatively large and require significant infrastructure and cost.

SUMMARY OF THE INVENTION

A mobile computer that can be borne in a vehicle is configured to receive position information. The computer is also configured to communicate a speed limit associated with the position information and adjusted to account for road conditions to cause a vehicle to automatically reduce speed below an adjusted maximum limit.

The mobile computer may be configured to access a database of speed limits. It may further be configured to communicate with a sender of road conditions to receive the road conditions therefrom. The computer can be configured to apply rules to the road condition and to output an adjusted speed limit associated with the position information.

Alternatively, the computer can be configured to receive from a base station a speed limit adjusted for road conditions. To this end, an advanced televisions systems committee (ATSC) tuner can be provided in the computer.

In another aspect, a tangible computer storage medium is readable by a processor to automatically limit a vehicle maximum speed in response to an upper speed limit modified by application of rules relating to road conditions such that the vehicle may travel at any speed up to but not exceeding the upper speed limit.

In still another aspect, a method includes receiving a geographic position and accessing a database of speed limits to determine a nominal speed limit associated with the geographic information. The method also includes accessing current road condition information for the speed limit. If the current road condition information warrants, the method adjusts down the speed limit to render a modified speed limit.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
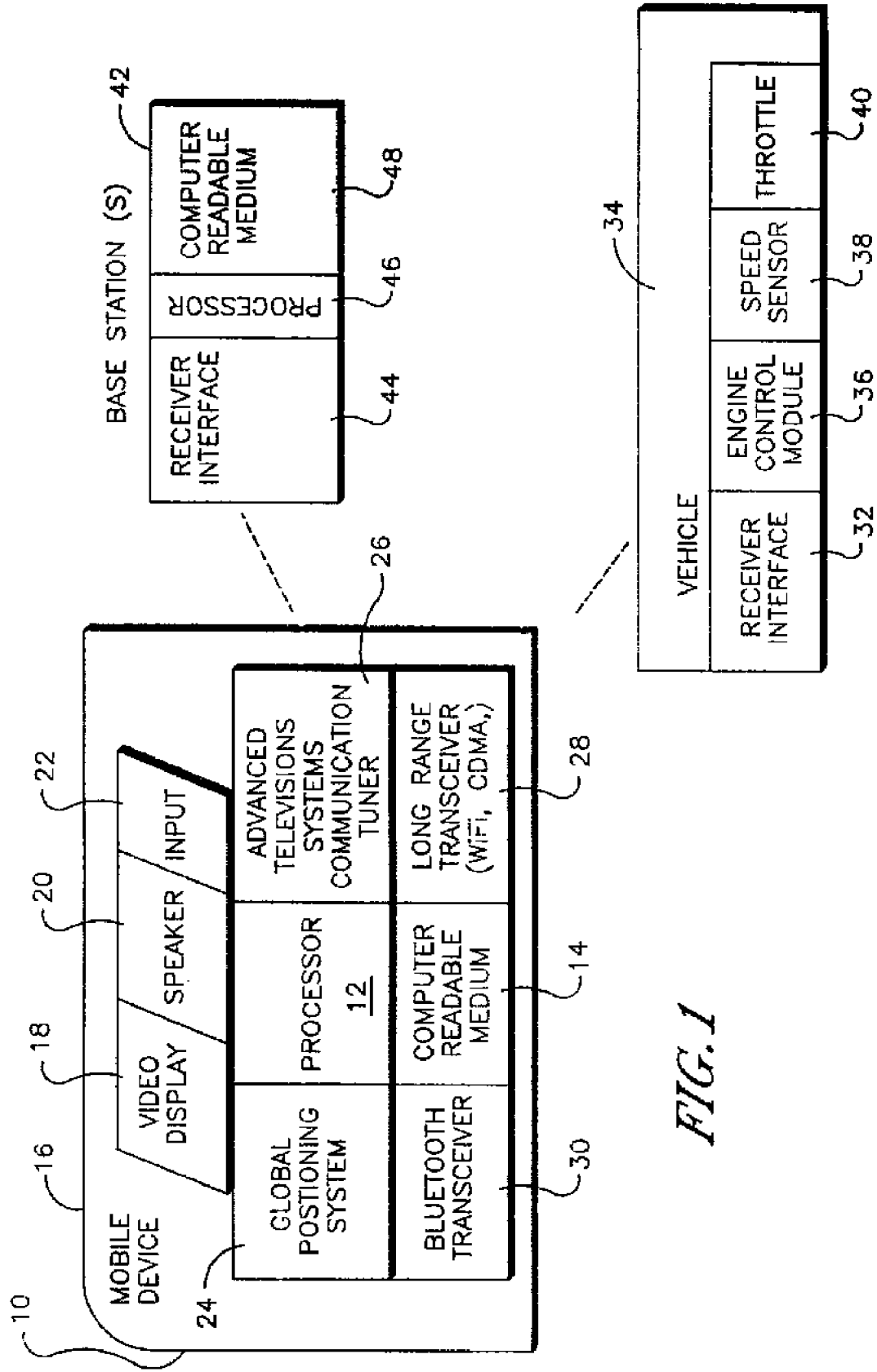
FIG. 1 is a schematic view of a non-limiting system in accordance with present principles.

Referring initially to FIG. 1, a mobile computer is shown, generally designated 10, that includes a processor 12 and tangible digital storage medium 14 that may be, without limitation, a magnetic or optical disk drive, a solid state device such as random access memory or read-only memory or flash memory, a removable stick medium or removable floppy disk, etc. The medium 14 and processor 12 may be stored in a computer housing 16 as shown along with a display 18 such as but not limited to a high definition (HD) matrix display or a standard definition cathode ray tube display. The processor 12 may output signals to the display 18 and to one or more audio speakers 20, and it may receive input from an input device 22 such as one or more of a keypad, keyboard, mouse, etc.

As shown in FIG. 1, in some embodiments the mobile computer 10 can also include a position receiver 24 such as a global positioning satellite (GPS) receiver that inputs position signals to the processor 12. Some embodiments of the mobile computer 10 may further include a unidirectional receiver 26 such as but not limited to an advanced televisions systems committee (ATSC) tuner. The processor 12 can cause signals from the receiver 26 to be presented on the display 18. In the embodiment shown, the ATSC receiver 26 can also receive non-video data for purposes to be shortly disclosed.

In the non-limiting implementation shown in FIG. 1, the mobile computer 10 additionally includes a long-range wireless transceiver 28 such as a WiFi transceiver, WIMAX transceiver, or telephone transceiver such as a global system for mobile communication (GSM) transceiver, code division multiple access (CDMA) transceiver or variant, etc. The transceiver 28 communicates with the processor 12.

In some embodiments, the mobile computer 10 can further include a Bluetooth transceiver 30 or other short-range interface useful for communicating with a complementarily configured receiver interface 32 of a vehicle 34. In this way, signals may be sent from the mobile computer 10 to an engine control module (ECM) 36 or other computer in the vehicle 34. The ECM 36 typically receives signals from, among other things, a speed sensor 38 onboard the vehicle 34 for control of, e.g., an engine throttle 40 of the vehicle 34 in a cruise control mode.

The mobile computer 10 can receive information via one or more of the receiver 26 and transceiver 28 from one or more wireless base stations 42, each of which typically has a communication interface 44, processor 46, and computer readable medium 48.

Figure 2:
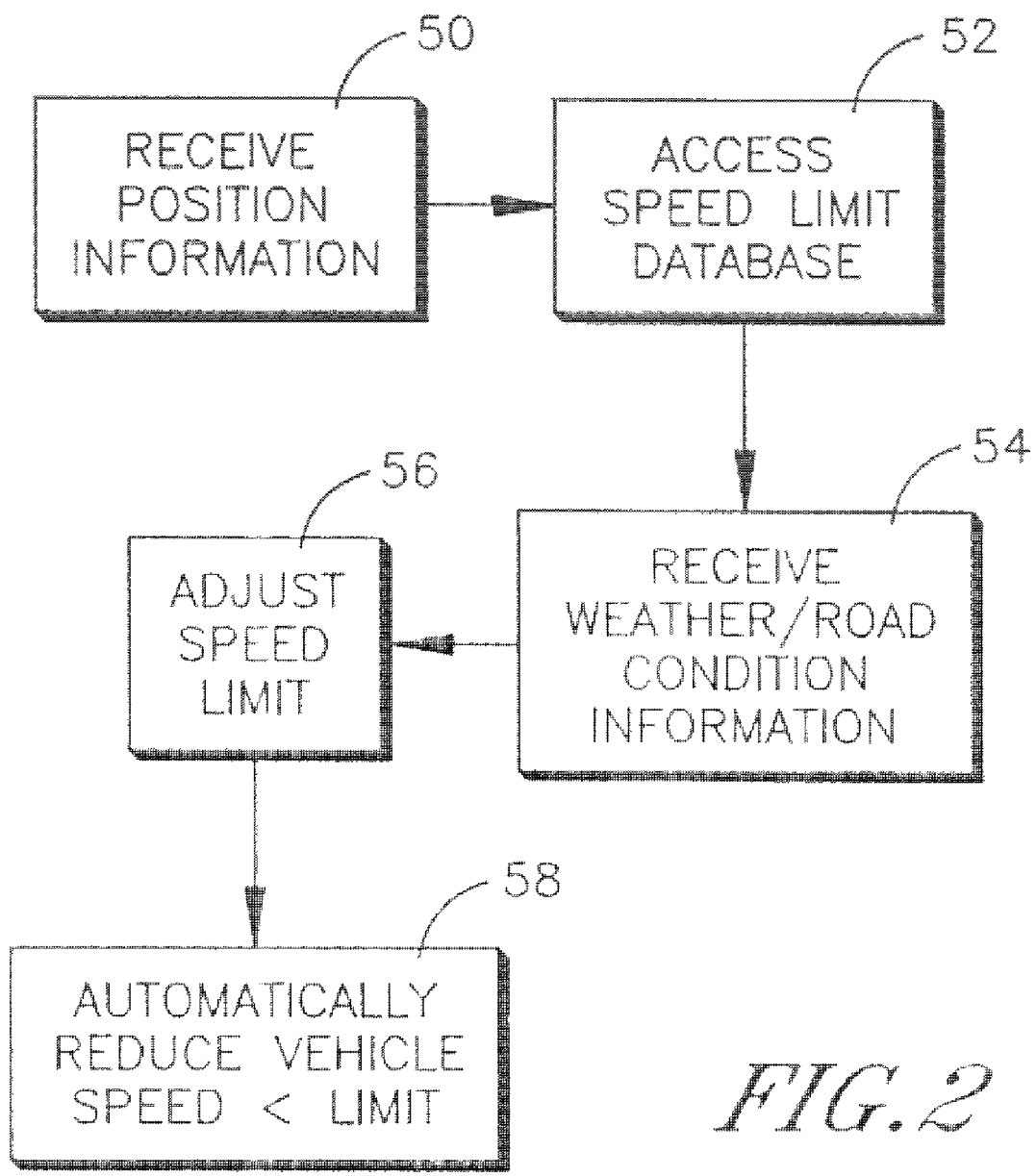
FIG. 2 is a flow chart of non-limiting logic which may be undertaken by one or more processors executing code elements stored on one or more computer readable media.

FIG. 2 shows logic in accordance with present principles that may be executed by one or more of the processors above accessing computer-readable instructions on one or more of the above-described computer readable media. Commencing at block 50, information pertaining to the current geographic position of the mobile device 10 (and, hence, any vehicle 34 in which it happens to be disposed) is received by the position receiver 24. In some embodiments the receiver 24 may be mounted directly in the vehicle and not on the mobile device 10, in which case the position can be sent from the ECM 36 to the processor 12 of the mobile device 10 using, e.g., the Bluetooth transceiver 30.

At block 52, a speed limit database is accessed to determine the published speed limit for the current position received at block 50. The processor 12 may access the medium 14 within the mobile device 10 for this purpose, or the base station processor 46 may access the database as it may be stored on, e.g., the medium 48 in the base station 42. The base station 42 may then send the relevant speed limit (i.e., the speed limit for the current position) to the mobile device 10.

Proceeding to block 54, current road condition information (including weather information, which affects road condition) is accessed. For this purpose, the base station 42 may send road condition information to the mobile device 10 via, e.g., the tuner 26 or the long range transceiver 28, or the subsequent logic at block 56 may be executed internally at the base station 42. In any case, the road condition information may be accessed from, e.g. a state road condition information server on the Internet or a National Oceanic and Atmospheric Administration (NOAA) weather information site or other appropriate source.

At block 56, the published ("nominal") speed limit can be adjusted in accordance with the road condition information received at block 54. Typically, the published maximum limit is reduced for less than optimum road conditions; it is never increased. The rules for adjusting the speed limit may be universal or the rules may differ for each road or group of roads. The rules may be statistic-based or empirical.

By way of non-limiting example, a published speed limit of 65 mph may be reduced by 10 mph any time rain is indicated at block 54 for any and all roads having posted speed limits of 65. Or, the limit may be reduced by 5 mph for one road and 10 mph for another, different road when rain is indicated. Freezing rain mat result in greater reduction in speed limit.

Yet again, if statistics on one road indicate that most accidents occur in the rain at speeds in excess of 50 mph, while statistics on another road indicate that most accidents occur in the rain at speeds in excess of 40 mph, the speed limit for the first road may adjusted down to 45 mph while the speed limit for the second road may be adjusted down to 35 mph.

As further non-limiting examples, if road conditions indicate a single lane closure in the vicinity, a 10 mph reduction in speed limit may be effected, whereas a two lane closure may result in a 20 mph reduction. Statistics may be used in establishing these reduction amounts, e.g., if statistics show that on a 65 mph highway, a single lane closure leads to a spike in accidents at average speeds of 55 mph and greater, the speed limit may be adjusted down to 50 mph (i.e., reduced by 15 mph from the otherwise "nominal" limit) for single lane closures on that road. As mentioned above, such a rule may be universally applied or applied on a road by road basis.

The logic at block 56 may be executed by the mobile device 10, in which case the processor 12 receives the road condition information at block 54 from, e.g., a base station 42. Or, the logic at block 56 may be executed by the base station 42 and then the adjusted speed limit sent to the mobile device 10 using the above-described transmission paths.

At block 58, the adjusted limit is presented on the display 18/speakers 20. In this way, no large roadside signage is required, and the speed limit may be dynamically changed and presented to the driver. Further, not only may a government agency change the published, "nominal" speed limit directly, but present principles envision an automatic reduction in the speed limit presented to the driver based on less than optimum road conditions.

Also at block 58, the speed of the vehicle 34 may be automatically reduced to be no greater than the adjusted speed limit. To this end, the mobile device processor 12 may communicate the adjusted speed limit to the ECM 36 using, e.g., the Bluetooth transceiver 30, with the ECM then controlling the throttle 40 to ensure that the speed of the vehicle as indicated by the speed sensor 38 does not exceed the speed limit as adjusted for road conditions at block 56.

While the particular AUTOMATIC SPEED LIMIT ADJUST FOR ROAD CONDITIONS is herein shown and described in detail, it is to be understood that the subject matter which is encompassed by the present invention is limited only by the claims.

What is claimed is:

1. A mobile computer that can be borne in a vehicle and that:
   is configured to receive position information; and
   is configured to communicate a speed limit associated with the position information and adjusted to account for road conditions;
   wherein the speed limit is adjusted by a first amount of decrease based on a first inclement weather condition; and
   wherein the speed limit is adjusted by a second amount of decrease based on a second inclement weather condition.

2. The computer of claim 1, wherein the mobile computer is configured to access a database of speed limits.

3. The computer of claim 1, wherein the mobile computer is configured to communicate with a sender of road conditions to receive the road conditions therefrom.

4. The computer of claim 3, wherein the computer is configured to apply rules to the road condition and output an adjusted speed limit associated with the position information; wherein the rules applied to a single type of road condition account for the particular road to which the road condition pertains.

5. The computer of claim 1, wherein the computer is configured to receive from a base station a speed limit adjusted for road conditions.

6. The computer of claim 1, wherein the mobile computer includes an advanced televisions systems committee (ATSC) tuner.

7. A tangible computer storage medium readable by a processor to:
   automatically limit a vehicle maximum speed in response to an upper speed limit modified by application of rules relating to road conditions such that the vehicle may travel at any speed up to but not exceeding the upper speed limit;
   wherein the upper speed limit is modified by a first amount based on a single lane closure and a second amount based on closure of more than a single lane.

8. The medium of claim 7, wherein the medium is executable by the processor to:
   receive geographic position information, the road conditions being associated with the geographic position information.

9. The medium of claim 7, wherein the medium is executable by the processor to access a database of speed limits.

10. The medium of claim 7, wherein the medium is executable by the processor to communicate with a sender of road conditions to receive the road conditions therefrom.

11. The medium of claim 10, wherein the medium is executable by the processor to apply rules to the road condition and output an adjusted speed limit associated with the position information.

12. The medium of claim 7, wherein the medium is executable by the processor to receive from a base station a speed limit adjusted for road conditions.

\* \* \* \* \*